United States Patent
Douglas et al.

(10) Patent No.: US 11,141,934 B2
(45) Date of Patent: Oct. 12, 2021

(54) METHOD OF MANUFACTURING DUCT STRINGER

(71) Applicant: AIRBUS OPERATIONS LIMITED, Bristol (GB)

(72) Inventors: Paul Douglas, Bristol (GB); Anthony Bryant, Bristol (GB); Daniel Peachey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 295 days.

(21) Appl. No.: 16/454,394

(22) Filed: Jun. 27, 2019

(65) Prior Publication Data

US 2020/0001547 A1 Jan. 2, 2020

(30) Foreign Application Priority Data

Jun. 29, 2018 (GB) ....................... 1810731

(51) Int. Cl.
| | | |
|---|---|---|
| *B29C 65/00* | (2006.01) | |
| *B29C 70/00* | (2006.01) | |
| *B29D 99/00* | (2010.01) | |
| *B64C 3/00* | (2006.01) | |
| *B29C 70/02* | (2006.01) | |

(Continued)

(52) U.S. Cl.
CPC .............. *B29C 70/02* (2013.01); *B29C 65/70* (2013.01); *B29C 65/7847* (2013.01); *B29D 99/0003* (2013.01); *B64C 3/182* (2013.01); *B64C 3/34* (2013.01); *B29L 2023/22* (2013.01)

(58) Field of Classification Search
CPC ......... B29C 65/00; B29C 65/70; B29C 65/78; B29C 65/784; B29C 65/7847; B29C 70/00; B29C 70/02; B29D 99/00; B29D 99/0003; B64C 3/00; B64C 3/10; B64C 3/18; B64C 3/182; B64C 3/30; B64C 3/34
See application file for complete search history.

(56) References Cited

U.S. PATENT DOCUMENTS

| 8,043,554 B2 | 10/2011 | Yip et al. |
|---|---|---|
| 8,758,879 B2 | 6/2014 | Pearson et al. |

(Continued)

FOREIGN PATENT DOCUMENTS

| CN | 103273604 | 9/2013 |
|---|---|---|
| CN | 107139504 | 9/2017 |

(Continued)

OTHER PUBLICATIONS

Extended European Search Report for European Application No. 19182167.7, seven pages, dated Oct. 28, 2019.

*Primary Examiner* — Jacob T Minskey
*Assistant Examiner* — Matthew Hoover
(74) *Attorney, Agent, or Firm* — Nixon & Vanderhye P.C.

(57) ABSTRACT

A duct stringer is disclosed including a structural member with a hat-shaped cross-section. The structural member has a crown, a pair of webs and a pair of feet. A channel member with a U-shaped cross-section has a base and a pair of flanges. The flanges of the channel member are co-cured to opposed inner faces of the webs of the structural member. The structural member and the channel member together provide a duct with a closed cross-section which is adapted to transport fluid, for instance in an aircraft wing to provide a vent function in an aircraft fuel system.

16 Claims, 8 Drawing Sheets

(51) Int. Cl.
    *B29C 65/70*    (2006.01)
    *B29C 65/78*    (2006.01)
    *B64C 3/18*    (2006.01)
    *B64C 3/34*    (2006.01)
    *B29L 23/00*    (2006.01)

(56) References Cited

U.S. PATENT DOCUMENTS

| | | |
|---|---|---|
| 9,061,754 B2 | 6/2015 | Matheson et al. |
| 2008/0302915 A1* | 12/2008 | Yip .................. B29C 70/342 |
| | | 244/132 |
| 2010/0129850 A1 | 5/2010 | Knebel et al. |
| 2010/0139850 A1 | 6/2010 | Morris et al. |
| 2010/0148003 A1* | 6/2010 | Verweyen ............ B64D 13/00 |
| | | 244/119 |
| 2013/0316147 A1* | 11/2013 | Douglas ............ B29D 99/0003 |
| | | 428/172 |
| 2015/0336656 A1 | 11/2015 | Rolfes |
| 2015/0343715 A1 | 12/2015 | Cruzado Parla et al. |
| 2016/0339682 A1 | 11/2016 | Bahe et al. |
| 2016/0368617 A1 | 12/2016 | Best, III |
| 2018/0086429 A1 | 3/2018 | Sheppard et al. |

FOREIGN PATENT DOCUMENTS

| | | |
|---|---|---|
| EP | 1800842 | 6/2007 |
| EP | 2 987 720 | 2/2016 |

\* cited by examiner

METHOD OF MANUFACTURING DUCT STRINGER

CROSS RELATED APPLICATION

This application claims priority to United Kingdom (GB) Patent Application 1810731.8, filed Jun. 29, 2018, the entire contents of which are hereby incorporated by reference.

FIELD OF THE INVENTION

The present invention relates to a duct stringer adapted to transport fluid, and a method of manufacturing a duct stringer.

BACKGROUND OF THE INVENTION

US2013/0316147 discloses a stringer adapted to transport fluid in an aircraft wing. The stringer may be adapted to provide venting to one or more fuel tanks in the aircraft wing, or it may be adapted to provide fuel to the one or more fuel tanks. A downpipe is provided for providing a fluidic connection between the stringer and a fuel tank.

SUMMARY OF THE INVENTION

According to a first aspect of the invention, there is provided a method of manufacturing a duct stringer, the method comprising: providing a structural member with a hat-shaped cross-section, the structural member comprising a crown, a pair of webs and a pair of feet; providing a channel member with a U-shaped cross-section, the channel member comprising a base and a pair of flanges; and adhering the flanges of the channel member to opposed inner faces of the webs of the structural member so that the structural member and the channel member together provide a duct with a closed cross-section which is adapted to transport fluid.

Optionally the flanges of the channel member are adhered to the opposed inner faces of the webs of the structural member by a co-bonded, co-cured or secondary-bonded joint.

Optionally the flanges of the channel member are adhered to the opposed inner faces of the webs of the structural member by co-curing them to form co-cured joints.

The co-cured joints may be formed following a co-infusion process in which the channel member and the structural member are assembled as dry-fibre preforms and then co-infused with a resin or other matrix material. Such a co-infusion process provides a cost reduction compared with a pre-preg autoclave cure process.

Preferably the channel member and the structural member are assembled as dry-fibre preforms and then co-infused with a matrix material.

The flanges of the channel member may be adhered to the opposed inner faces of the webs of the structural member by a co-infusion process in which the channel member and the structural member are assembled as dry-fibre preforms and then co-infused with a matrix material.

Optionally the base and flanges of the channel member are made of a composite material, such as a fibre-reinforced composite material.

Optionally the duct stringer is adhered to a skin, to form a structure such as a wing skin structure.

Optionally the skin is made of a composite material, such as a fibre-reinforced composite material.

Optionally the step of adhering the flanges comprises inserting the channel member carried by a mandrel between the opposed inner faces of the webs of the structural member, and then expanding the mandrel so that the mandrel presses the flanges of the channel member against the opposed inner faces of the webs of the structural member. This prevents the flanges from snagging on the opposed inner faces of the webs as they are inserted, and in doing so alleviates wrinkling of the parts.

Optionally the mandrel comprises: a support core having a waisted cross-sectional shape with a pair of concave sides, and a bladder surrounding the core; wherein a vacuum is applied so that the bladder is sucked by the vacuum into the concave sides of the support core, and the vacuum continues to be applied as the mandrel is inserted between the opposed inner faces of the webs; and wherein after insertion the mandrel is expanded by releasing the vacuum or applying a positive pressure so that the bladder is pushed away from the concave sides of the support core. Thus in this case the bladder is pushed away from the concave sides of the support core and against the opposed inner faces of the webs of the structural member. In other words, the bladder pushes the flanges of the channel member against the opposed inner faces of the webs of the structural member.

Optionally the channel member is formed over the mandrel in a flange forming stage.

In one embodiment the vacuum is applied before the flange forming stage, and continues to be applied during the flange forming stage so that the support core is in a contracted state during the flange forming stage.

In an alternative embodiment the vacuum is not applied during the flange forming stage so that the support core is in a relaxed state during the flange forming stage.

Before the vacuum is applied there may be gaps between the bladder and the concave sides of the support core, and the bladder is sucked by the vacuum into the gaps. Alternatively there may be no gaps between the bladder and the concave sides of the support core before the vacuum is applied.

Optionally the application of the vacuum causes the support core to contract.

Optionally the support core is made of a compressible or resilient material, such as rubber, so that application of the vacuum causes the support core to contract.

Optionally the bladder is made of an elastomeric material, such as rubber.

According to a further aspect of the invention, there is provided a duct stringer comprising: a structural member with a hat-shaped cross-section, the structural member comprising a crown, a pair of webs and a pair of feet; and a channel member with a U-shaped cross-section, the channel member comprising a base and a pair of flanges, wherein the flanges of the channel member are adhered to opposed inner faces of the webs of the structural member, and the structural member and the channel member together provide a duct with a closed cross-section which is adapted to transport fluid.

Optionally the flanges of the channel member are adhered to the opposed inner faces of the webs of the structural member by a co-bonded, co-cured or secondary-bonded joint.

Optionally the base and flanges of the channel member are made of a composite material, such as a fibre-reinforced composite material.

Optionally the duct stringer is adhered to a skin, the skin and stringer together providing a stiffened panel structure such as a wing skin structure.

Optionally the skin is made of a composite material, such as a fibre-reinforced composite material.

Optionally the feet of the structural member are adhered to the skin.

Optionally the duct stringer is adhered to the skin by a co-bonded, co-cured or secondary-bonded joint.

Optionally the duct is in fluid communication with first and second tanks of a fuel tank system. For example the first tank is a fuel tank, and the second tank is a surge tank. In this case the duct stringer is a vent stringer. Alternatively the duct stringer may be used for another function, for instance transporting fuel between different parts of an aircraft or other vehicle.

Optionally one or both of the tanks are in an aircraft wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
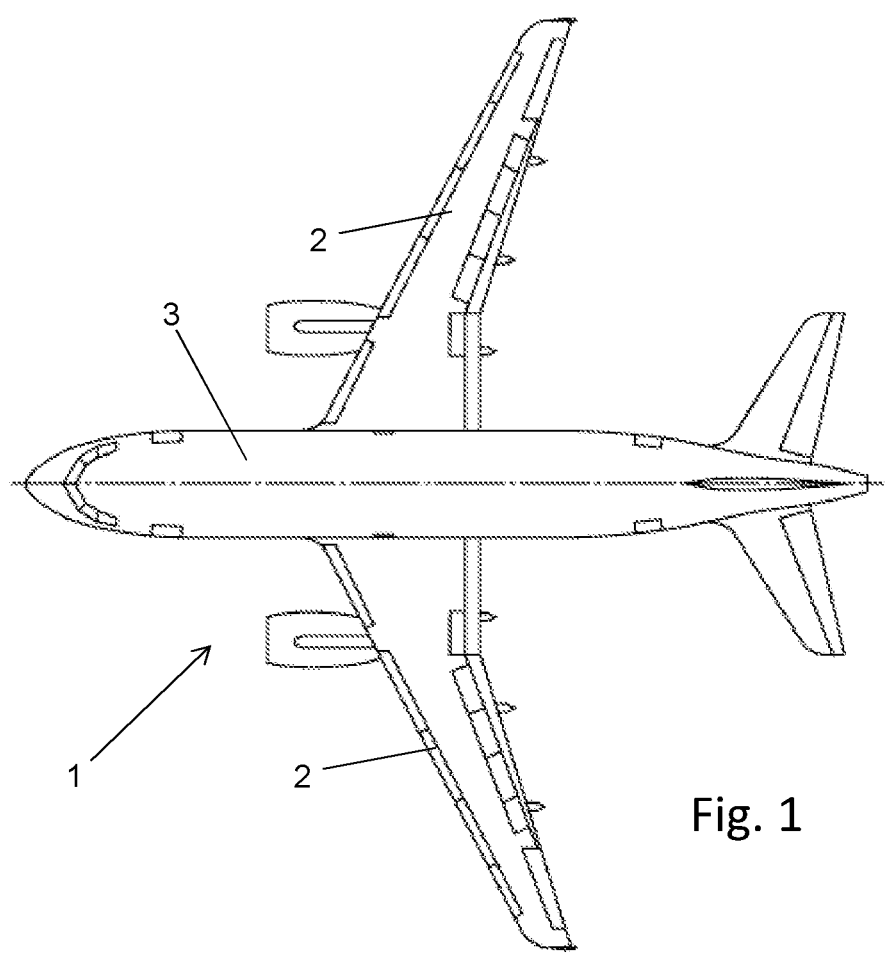
FIG. 1 is a plan view of an aircraft.
Figure 2:
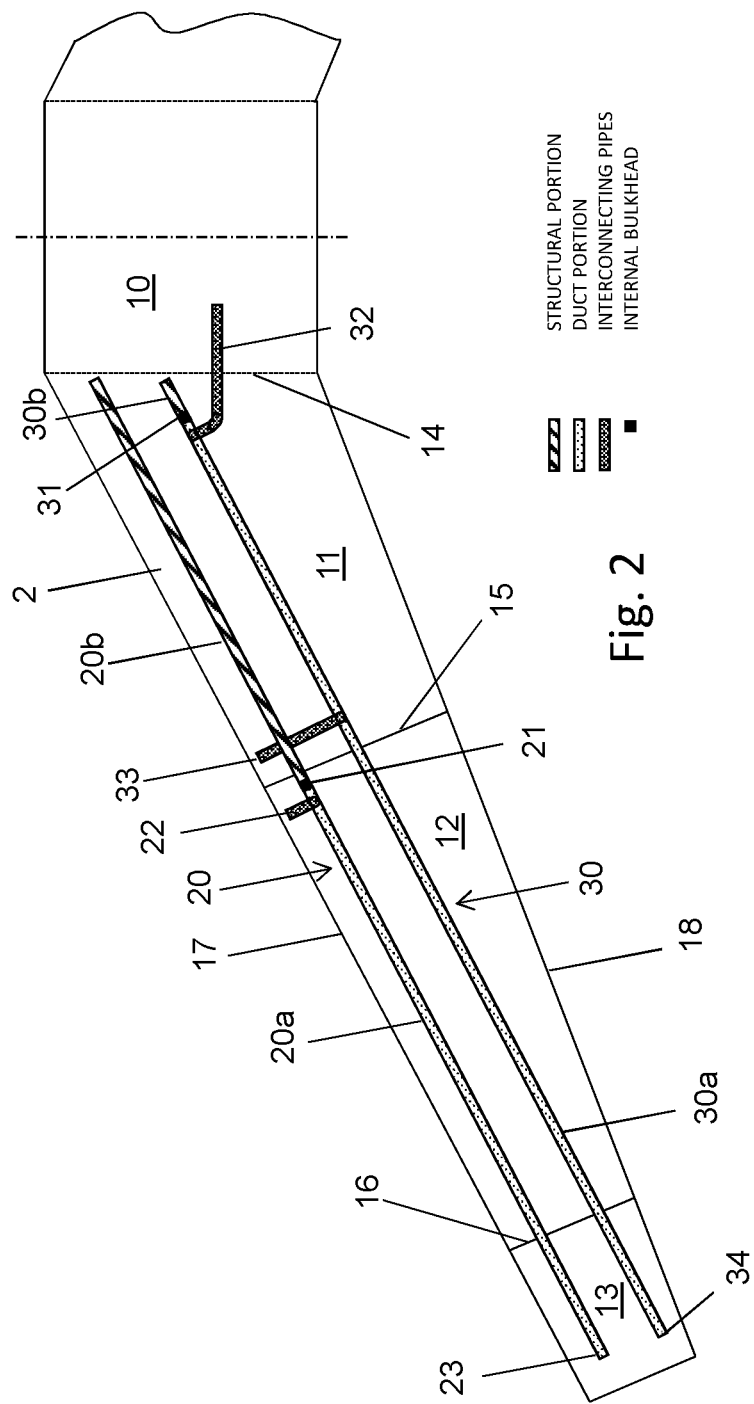
FIG. 2 is a plan view of the aircraft's fuel tank system.

FIG. 1 is a plan view of an aircraft 1 comprising a pair of wings 2 and a fuselage 3. FIG. 2 is a plan view of certain elements of the aircraft's fuel tank system, including a centre fuel tank 10 inside the fuselage, and wing tanks 11-13 inside the wing 2. The wing tanks comprise an inboard fuel tank 11, an outboard fuel tank 12 and a surge tank 13. The tanks 10-13 are separated by ribs 14-16.

The wing tanks 11-13 are bounded fore and aft by spars 17, 18. The upper and lower boundaries of the wing tanks 11-13 are provided by upper and lower wing skins, not shown in FIG. 2. Each wing skin is stiffened by stringers running span-wise along the length of the wing. Two of the stringers attached to the upper wing skin are so-called "duct stringers" 20, 30 which are shown in FIG. 2. The other stringers attached to the upper wing skin are not shown in order to simplify the drawing.

Each duct stringer 20, 30 includes a duct portion 20a, 30a outboard of an internal bulkhead 21, 31; and a structural portion 20b, 30b inboard of the internal bulkhead 21, 31.

The duct portion 20a of the duct stringer 20 is in fluid communication with the outboard fuel tank 12 via an interconnecting pipe 22 and with the surge tank 13 via an outlet 23 at the end of the stringer 20. The duct portion 30a of the duct stringer 30 is in fluid communication with the inboard fuel tank 11 via an interconnecting pipe 33 and with the surge tank 13 via an outlet 34 at the end of the stringer 30. The duct portion 30a of the duct stringer 30 is also in fluid communication with the centre fuel tank 10 via an interconnecting pipe 32. Optionally, the distal end of each interconnecting pipe 22, 32, 33 is fitted with a bell mouth or float valve, not shown.

During operation of the aircraft, the duct stringers 20, 30 are used to transport air in either direction between the surge tank 13 and the fuel tanks 10-13 in order to manage the air pressure within the tanks. So each duct stringer 20, 30 has two functions: stiffening the upper wing skin; and providing a duct which transports air to and from the surge tank 13.

Figure 3:
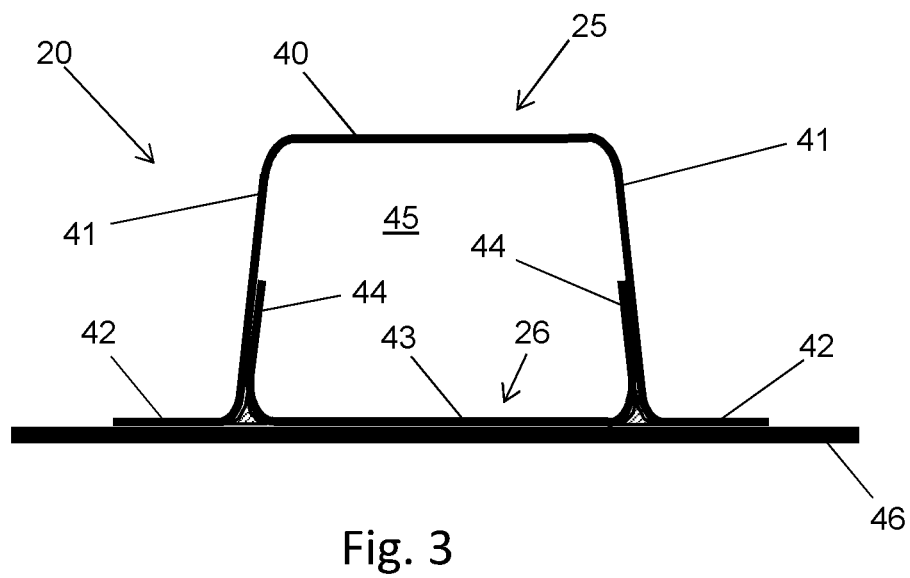
FIG. 3 is a cross-sectional view of an a structure comprising a skin and a duct stringer.

FIG. 3 is a cross-sectional view of the duct stringer 20 and the upper wing skin 46 which carries it. The other duct stringer 30 has an identical construction. The duct stringer 20 comprises a structural member 25 with a hat-shaped cross-section, and a channel member 26 with a U-shaped cross-section. The structural member has a crown 40, a pair of webs 41 and a pair of feet 42. The channel member has a base 43 and a pair of flanges 44. The flanges 44 of the channel member are adhered to opposed inner faces of the webs 41 of the structural member by respective co-cured joints. The feet 42 of the structural member and the base 43 of the channel member are adhered to the upper wing skin 46 by co-cured, co-bonded or secondary bonded joints. The structural member 25 and the channel member 26 together provide a duct 45 with a closed trapezoidal cross-section which is adapted to transport fluid.

The interconnecting pipe 22 is connected to the duct 45 by cutting a hole in the crown 40, and attaching a downpipe fitting (not shown) such as the fitting described in US2013/0316147, the disclosure of which is incorporated herein by reference.

A method of manufacturing the duct stringer 20 is shown in FIGS. 4-15.

Figure 4:
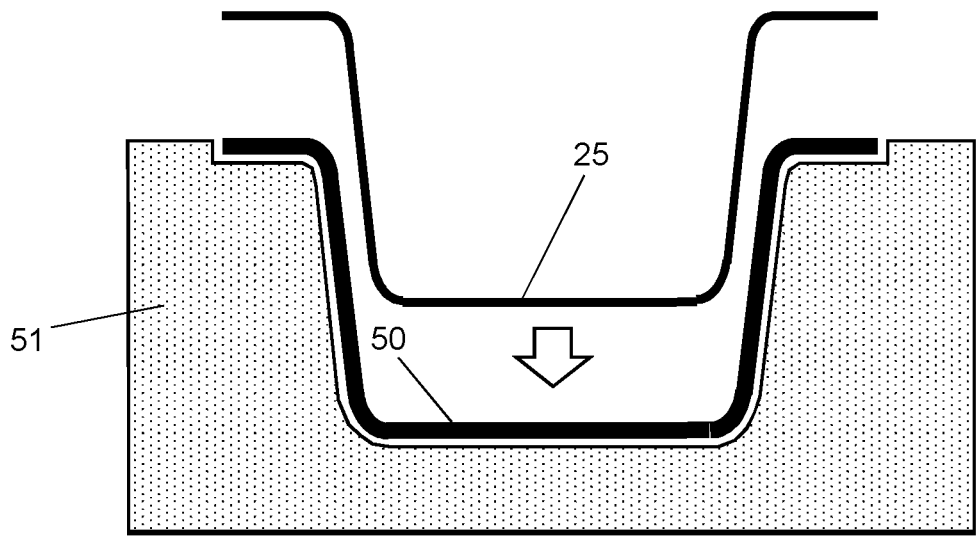
FIGS. 4-15 show a method of manufacturing the structure of FIG. 3.

A carbon-fibre composite caul plate 50 is fitted into a metal female tool 51. The structural member 25 is either press-formed into the caul plate 50 as shown in FIG. 4, or press-formed onto a male tool (now shown) which is then inserted into the caul plate 50. The structural member 25 at this stage is a dry-fibre preform, which is a laminate of dry carbon-fibre plies. Alternatively, the plies may be hand laid or roll-formed or formed using another suitable forming method.

Figure 5:
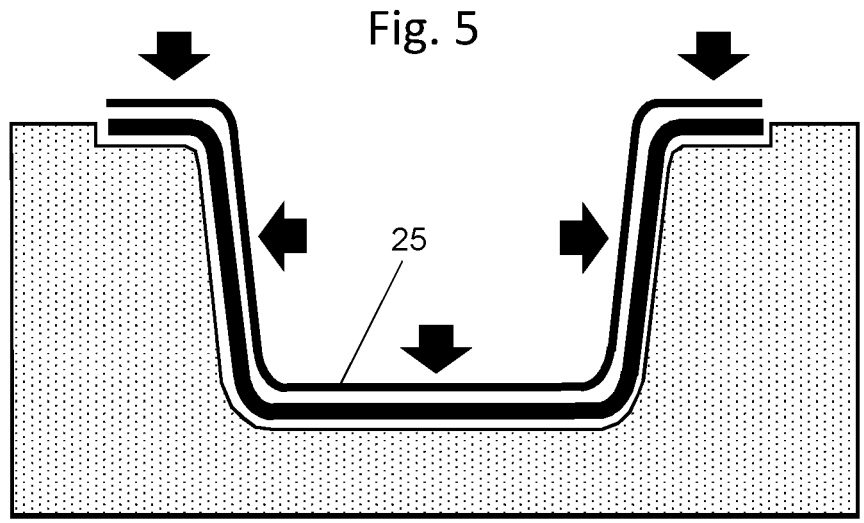

Next the structural member 25 is de-baulked as required by applying pressure indicated by the arrows in FIG. 5.

Figure 6:
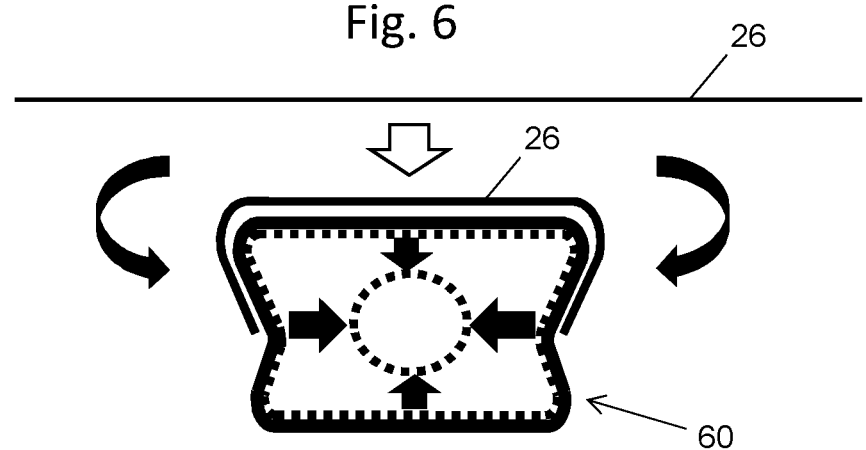

The channel member 26 is formed by the process shown in FIG. 6. The channel member 26 is first laid up as a flat dry-fibre stack, which is a flat laminate of dry carbon-fibre plies. The flat dry-fibre stack 26 is then bent at each edge over a mandrel 60 to form the flanges 44 of the channel member 26.

Figure 7:
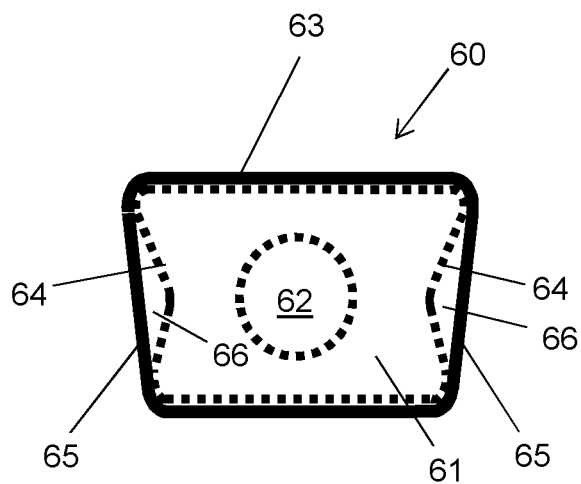

The mandrel 60, as shown in FIG. 7, comprises a support core 61 with a hollow centre 62, and a rubber bladder 63 surrounding the core. The support core 61 has a waisted cross-sectional shape with a pair of concave sides 64. The core 61 is made from a stiffened elastomeric material with no perforations or holes (other than the hollow centre 62). The bladder 63 has a trapezoid cross-sectional shape with a pair of angled sides 65.

Figure 8:
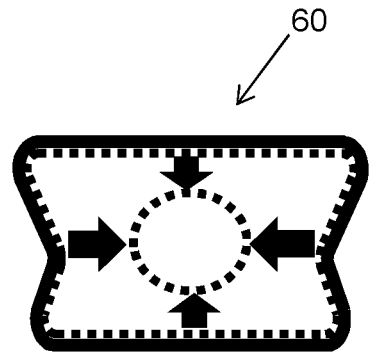

When the mandrel is in its relaxed state shown in FIG. 7, there are gaps 66 between the angled sides 65 of the bladder and the concave sides 64 of the support core. The bladder 63 is closed at one end and open at the other. Application of a vacuum to the interior of the bladder via a fitting (not shown) at the open end of the bladder causes the bladder to be sucked into gaps 66 and the core 61 to contract width-wise and height-wise as shown in FIG. 8. The hollow centre 62 of the core assists in this contraction and also reduces the weight of the core 61. The mandrel 60 is now in a contracted state. The flat dry-fibre stack is formed over the mandrel 60 in FIG. 6 with the mandrel 60 in this contracted state.

Figure 9:
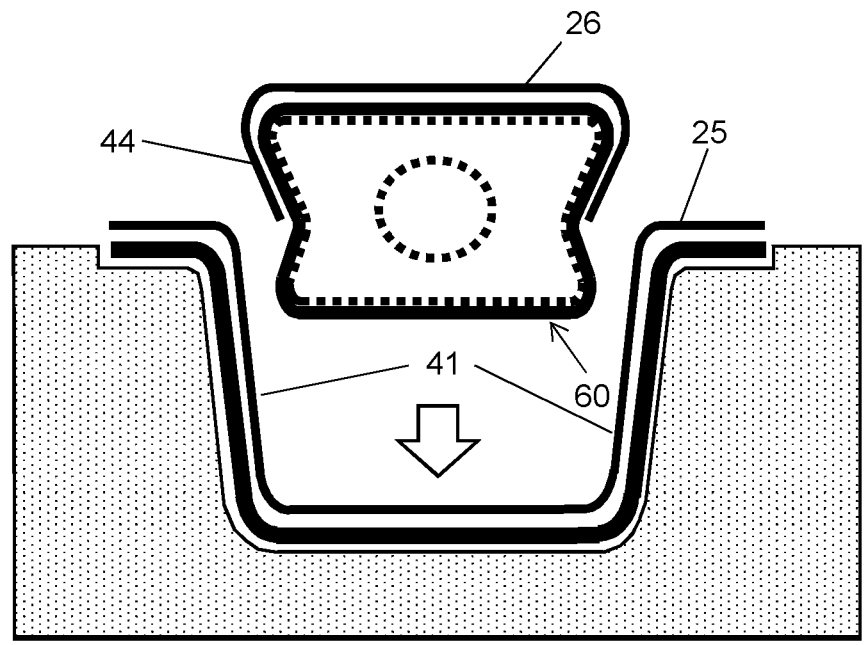

Next, the mandrel 60 carrying the channel member 26 is inserted into the channel between the opposed inner faces of the webs 41 as shown in FIG. 9. The vacuum continues to be applied so that mandrel 60 remains in its contracted state as it is inserted. This prevents the mandrel 60 or the flanges 44 from catching on the webs 41 as they are inserted.

Figure 10:
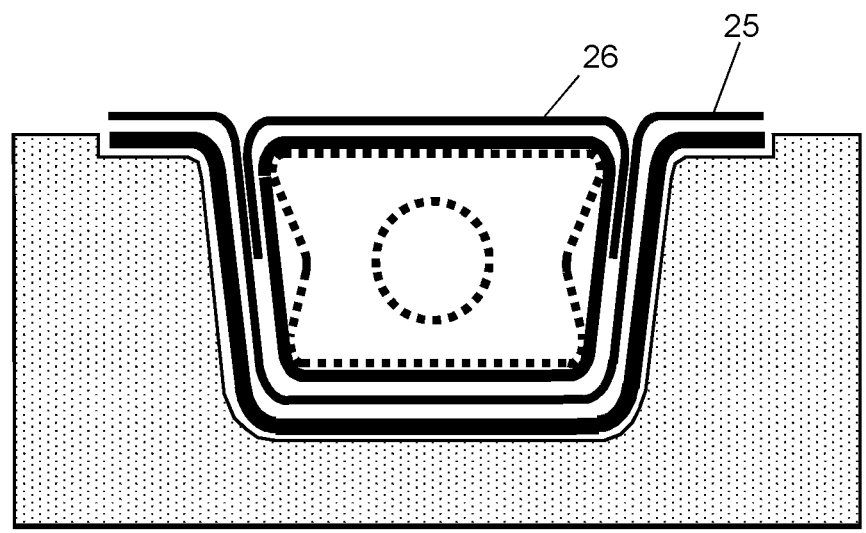

Next the vacuum is released so that the mandrel 60 expands back to its relaxed state shown in FIG. 10 and the flanges 44 are pressed into contact with the webs 41. Thus the mandrel 60 is expanded by releasing the vacuum so that the bladder 63 is pushed away from the concave sides of the support core and presses the flanges 44 against the opposed inner faces of the webs 41 of the structural member. In this case the mandrel is expanded by releasing the vacuum, but optionally the mandrel is expanded further by applying a positive pressure inside the bladder.

Figure 11:
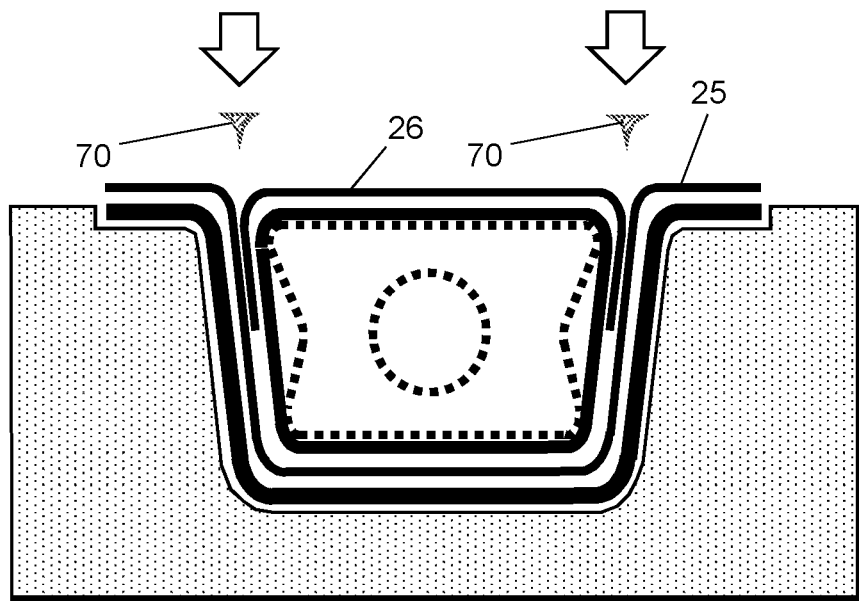
Figure 12:
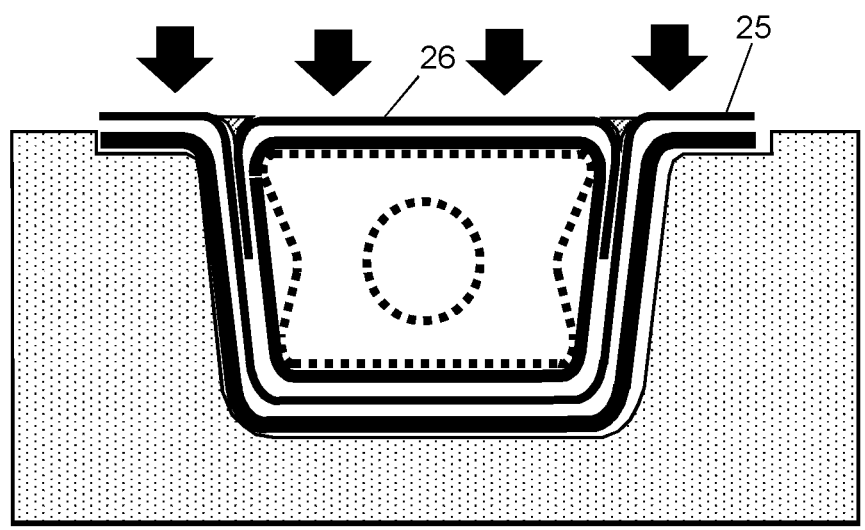

Preformed noodles 70 are then inserted as shown in FIG. 11, and the assembly is de-baulked as required by applying pressure indicated by the arrows in FIG. 12.

Figure 13:
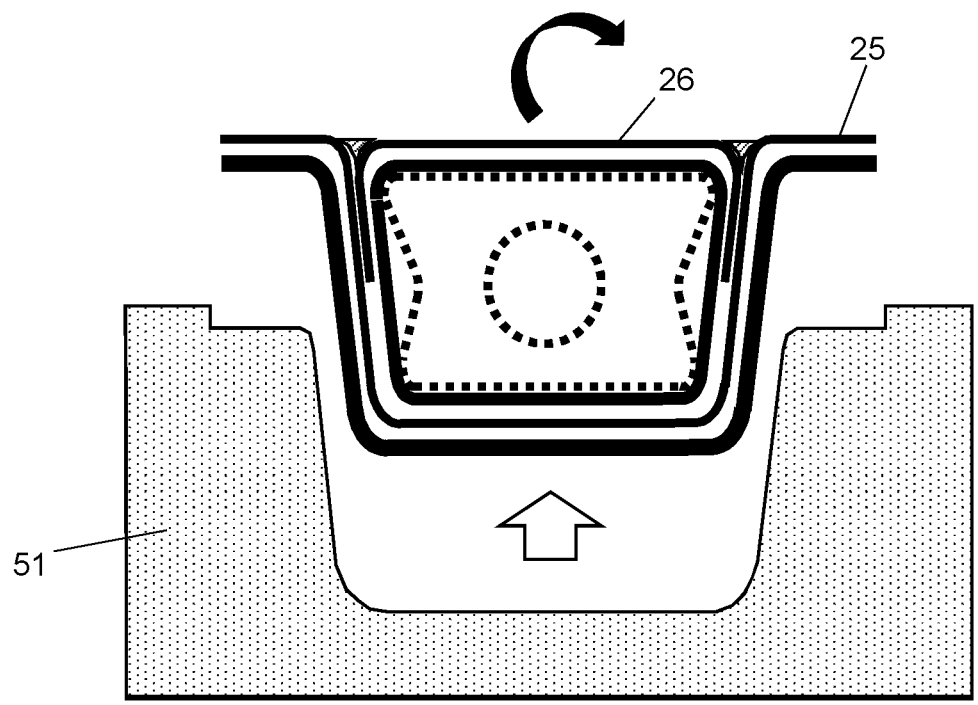
Figure 14:
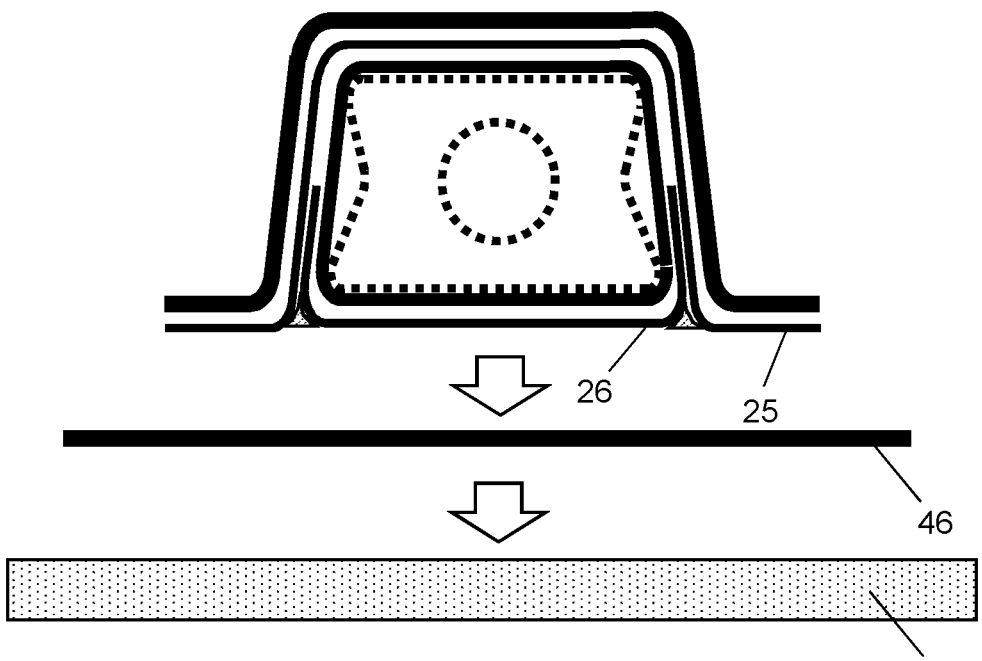

Next the assembly is removed from the tool 51 as shown in FIG. 13, and placed on the upper wing skin 46 on an infusion tool 71 as shown in FIG. 14. The upper wing skin 46 at this stage is a dry-fibre preform, which is a laminate of dry carbon-fibre plies.

Figure 15:
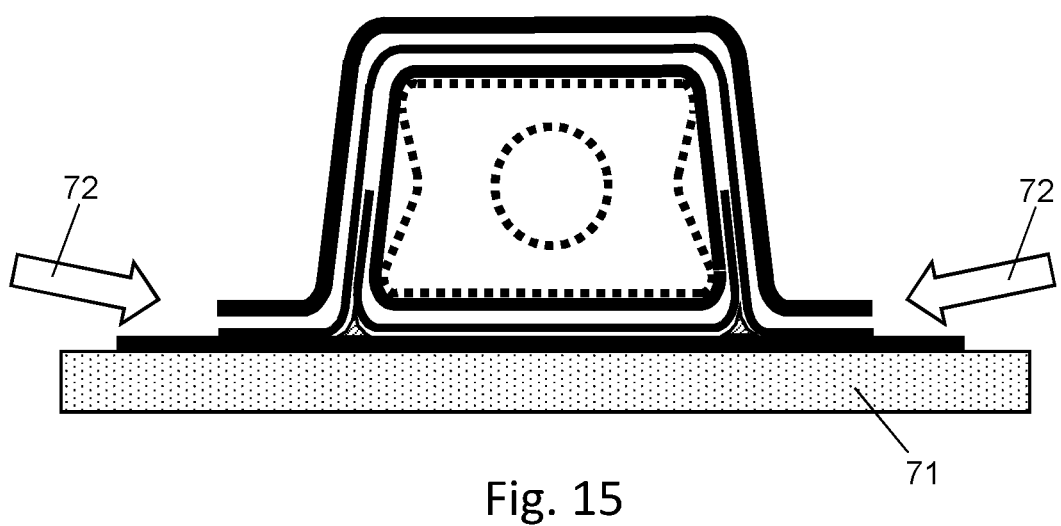

Finally the upper wing skin 46 and the assembly are vacuum bagged and co-infused with epoxy resin 72 as shown in FIG. 15. The epoxy resin 72 infuses the dry fibre plies of the upper wing skin 46, the structural member 25 and the channel member 26, and as the epoxy resin 72 cures following the infusion process it forms the various co-cured joints between the co-infused parts.

After the resin has cured, vacuum is applied again to the interior of the bladder which causes the mandrel 60 to contract and enables it to be pulled lengthwise out of the duct 45 leaving the finished structure of FIG. 3.

Optionally the hollow centre 62 of the core 61 could be used to apply vacuum causing the core to collapse, to assist with its removal from a double curved and span-wise ramped wing structure.

In the method described above, the structure is formed by infusion of resin into dry fibre preforms, but alternatively some or all of the carbon-fibre components may be laid up as "pre-preg" laminates, where each ply in the laminate is a fibre ply pre-impregnated with epoxy resin.

In the example above, when the mandrel is in its relaxed state shown in FIG. 7, the bladder has a trapezoidal shape with a pair of gaps 66 between the angled sides 65 of the bladder and the concave sides 64 of the support core. In an alternative embodiment, when the mandrel is in its relaxed state the bladder has a waisted shape matching that of the support core 61, so there are no gaps. In this case, vacuum does not need to be applied during the flange forming stage of FIG. 6. After the flanges 44 have been formed, vacuum is applied which causes a small contraction of the mandrel which is sufficient to ensure enough clearance as the mandrel carrying the channel member is inserted as in FIG. 9. As in the example above, the mandrel is expanded by releasing the vacuum and/or applying a positive pressure so that the bladder is pushed away from the concave sides 64 of the support core 61.

So in one embodiment the vacuum is applied before the flange forming stage, and continues to be applied during the flange forming stage so that the support core is in a contracted state during the flange forming stage as shown in FIG. 6. In the alternative embodiment the vacuum is not applied during the flange forming stage so that the support core is in a relaxed state during the flange forming stage of FIG. 6.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of manufacturing a duct stringer, the method comprising:
   a. providing a structural member with a hat-shaped cross-section, the structural member comprising a crown, a pair of webs and a pair of feet;
   b. providing a channel member with a U-shaped cross-section, the channel member comprising a base and a pair of flanges; and
   c. adhering the flanges of the channel member to opposed inner faces of the webs of the structural member so that the structural member and the channel member together provide a duct with a closed cross-section which is adapted to transport fluid.

2. A method according to claim 1, wherein the step of adhering the flanges comprises inserting the channel member carried by a mandrel between the opposed inner faces of the webs of the structural member, and then expanding the mandrel so that the mandrel presses the flanges of the channel member against the opposed inner faces of the webs of the structural member.

3. A method according to claim 2, wherein the mandrel comprises: a support core having a waisted cross-sectional shape with a pair of concave sides, and a bladder surrounding the core;
   wherein a vacuum is applied so that the bladder is sucked by the vacuum into the concave sides of the support core, and the vacuum continues to be applied as the mandrel is inserted between the opposed inner faces of the webs; and
   wherein after insertion, the mandrel is expanded by releasing the vacuum or applying a positive pressure so that the bladder is pushed away from the concave sides of the support core.

4. A method according to claim 3, wherein the application of the vacuum causes the support core to contract.

5. A method according to claim 4 wherein the support core is made of a compressible or resilient material.

6. A method according to claim 3, wherein the bladder is made of an elastomeric material.

7. A method according to claim 3, wherein the channel member is formed over the mandrel in a flange forming stage, and the vacuum is applied before the flange forming stage and continues to be applied during the flange forming stage.

8. A method according to claim 1, wherein the flanges of the channel member are adhered to the opposed inner faces of the webs of the structural member by a co-bonded, co-cured or secondary-bonded joint.

9. A method according to claim 1, wherein the flanges of the channel member are adhered to the opposed inner faces of the webs of the structural member by co-curing them to form co-cured joints.

10. A method according to claim 1, wherein the channel member and the structural member are assembled as dry-fibre preforms and then co-infused with a matrix material.

11. A method according to claim 1, wherein the flanges of the channel member are adhered to the opposed inner faces of the webs of the structural member by a co-infusion process in which the channel member and the structural member are assembled as dry-fibre preforms and then co-infused with a matrix material.

12. A method according to claim 1, wherein the base and flanges of the channel member are made of a composite material.

13. A method of manufacturing a structure, the method comprising: manufacturing a duct stringer by the method of claim 1; and adhering the duct stringer assembly to a skin.

14. A method according to claim 13, wherein the feet of the structural member are adhered to the skin.

15. A method according to claim 13, wherein the duct stringer assembly is adhered to the skin by a co-bonded, co-cured or secondary-bonded joint.

16. A method according to claim 13, wherein the skin is an aircraft wing skin.

* * * * *